United States Patent
Takahashi (10) Patent No.: US 12,149,145 B1
(45) Date of Patent: Nov. 19, 2024

(54) OUTER ROTOR BRUSHLESS MOTOR

(71) Applicant: MABUCHI MOTOR CO., LTD., Matsudo (JP)

(72) Inventor: Takuya Takahashi, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/704,921

(22) PCT Filed: May 30, 2023

(86) PCT No.: PCT/JP2023/020148
§ 371 (c)(1),
(2) Date: Apr. 26, 2024

(51) Int. Cl.
| | |
|---|---|
| H02K 5/16 | (2006.01) |
| F16C 17/02 | (2006.01) |
| H02K 1/14 | (2006.01) |
| H02K 5/167 | (2006.01) |
| H02K 7/08 | (2006.01) |
| H02K 21/22 | (2006.01) |

(52) U.S. Cl.
CPC ........... H02K 5/1675 (2013.01); F16C 17/02 (2013.01); H02K 1/146 (2013.01); H02K 7/085 (2013.01); H02K 21/22 (2013.01); *F16C 2380/26* (2013.01)

(58) Field of Classification Search
CPC .. H02K 5/1675; H02K 5/1677; H02K 5/1672; H02K 1/146; H02K 7/085; H02K 21/22; F16C 17/02; F16C 2380/26
USPC .......................................................... 310/90
See application file for complete search history.

(56) References Cited

U.S. PATENT DOCUMENTS

2017/0167537 A1   6/2017   Tuchiya
2022/0278598 A1   9/2022   Ohba et al.

FOREIGN PATENT DOCUMENTS

| CN | 102545458 A | 7/2012 |
| CN | 114977640 A | 8/2022 |
| JP | 2001-061253 A | 3/2001 |
| JP | 2012-125129 A | 6/2012 |
| JP | 2017-034740 A | 2/2017 |
| JP | 2020-159556 A | 10/2020 |
| JP | 2022-131843 A | 9/2022 |
| KR | 10-2012-0052174 A | 5/2012 |

OTHER PUBLICATIONS

International Search Report in PCT Application No. PCT/JP2023/020148 mailed Jul. 11, 2023, 5pp.
Written Opinion in PCT Application No. PCT/JP2023/020148 mailed Jul. 11, 2023, 6pp.

*Primary Examiner* — Terrance L Kenerly
(74) *Attorney, Agent, or Firm* — HAUPTMAN HAM, LLP (57) ABSTRACT

An outer rotor brushless motor includes: a shaft; a rotor; a stator; a tubular bushing at one side of the stator; an impregnated bearing at the other side of the bushing; and a washer rotatable integrally with the shaft. The bushing has: a fixed portion fixed to a core inner peripheral surface, the fixed portion having a first end surface facing a bearing end surface, and a first inner peripheral surface facing an outer peripheral surface with first clearance in between; and a housing having a second inner peripheral surface with a greater diameter than the first inner peripheral surface, on the one side of the fixed portion. An oil repellent finish is applied to a surface of the bushing. The washer is placed radially inward of the second inner peripheral surface. Second clearance greater than the first clearance is between the bearing end surface and the first end surface.

8 Claims, 4 Drawing Sheets

OUTER ROTOR BRUSHLESS MOTOR

RELATED APPLICATIONS

The present application is a National Phase of International Application No. PCT/JP2023/020148 filed May 30, 2023.

TECHNICAL FIELD

The present invention relates to an outer rotor brushless motor including an impregnated bearing that supports a shaft rotatably.

BACKGROUND ART

An outer rotor motor may adopt an impregnated bearing as a bearing that supports a shaft rotatably. The impregnated bearing is a bearing that is impregnated with oil inside, and is also called an oil-impregnated bearing. In the bearing, a viscous oil film is placed between two surfaces that slide relative to each other (that is, between an inner peripheral surface of the impregnated bearing and an outer peripheral surface of the shaft) to support the shaft by use of the pressure of the oil film.

If the amount of oil is reduced in the impregnated bearing, it may lead to inhibition of smooth rotation of the shaft and a reduction in the life of the impregnated bearing. Hence, various structures that suppress a reduction in the amount of oil have been proposed. For example, a structure in which a recessed portion is provided radially into an end surface of an impregnated bearing and a disk-shaped washer that rotates integrally with a shaft is provided in the recessed portion is disclosed in a motor disclosed in Patent Literature 1. According to Patent Literature 1, oil that has leaked along the shaft is splashed by the washer onto an inner peripheral surface of the recessed portion, and is sucked into the impregnated bearing; therefore, suppression of a reduction in the amount of oil is encouraged.

CITATION LIST

Patent Literature

Patent Literature 1: JP-A-2001-061253

DISCLOSURE OF THE INVENTION

Problems to be Solved by the Invention

The structure that suppresses a reduction in the amount of oil is not provided outside the recessed portion in the motor disclosed in Patent Literature 1. Hence, there is not anything the motor disclosed in Patent Literature 1 can do to recover the oil splashed outward of the recessed portion, and there is room for improvement in further suppression of a reduction in the amount of oil. Moreover, it is preferable that a motor including an impregnated bearing be provided with a structure that, if the oil that has leaked from the impregnated bearing is not recovered sufficiently, suppresses the escape of the unrecovered oil to the outside of the motor; therefore, there is also room for improvement in this point.

In the outer rotor brushless motor of the present invention has been devised in view of such problems, and one of objects thereof is to suppress a reduction in the amount of oil in an impregnated bearing and, even if the oil that has leaked from the impregnated bearing is not recovered sufficiently, suppress the escape of the oil to the outside of the motor. Note that the present invention is not limited to this object, and another object of the present invention is to exert operations and effects that are derived from configurations presented in DESCRIPTION OF PREFERRED EMBODIMENT described below and cannot be obtained by the known technology.

Solutions to the Problems

An outer rotor brushless motor of the disclosure can be achieved as aspects (application examples) disclosed below, and solves at least a part of the above problems. Any of Aspect 2 and subsequent aspects is an aspect that can be additionally selected as appropriate, and is an aspect that can be omitted. Any of Aspect 2 and the subsequent aspects does not disclose an aspect and configuration that are essential to the present invention.

Aspect 1. An outer rotor brushless motor of the disclosure includes: a rotor configured to rotate integrally with a shaft: a stator placed radially outward of the shaft and radially inward of the rotor; a tubular bushing that is fixed to one end side of the stator and through which the shaft is inserted: an impregnated bearing placed radially inward of the stator and on the other end side of the bushing and configured to support the shaft rotatably; and a washer provided on the one end side relative to the impregnated bearing and configured to rotate integrally with the shaft. The bushing includes: a fixed portion fixed to a core inner peripheral surface of the stator, the fixed portion having: a first end surface facing a bearing end surface on the one end side of the impregnated bearing; and a first inner peripheral surface facing an outer peripheral surface of the shaft with first clearance in between with the outer peripheral surface; and a housing portion having a second inner peripheral surface with a greater diameter than the first inner peripheral surface, on the one end side of the fixed portion, and an oil repellent finish is applied to at least the first end surface and the first inner peripheral surface. The washer is placed radially inward of the second inner peripheral surface, and second clearance greater than the first clearance is provided between the bearing end surface and the first end surface.

Aspect 2. In the above aspect 1, it is preferable that the outer rotor brushless motor further include a second washer placed in the second clearance and configured to rotate integrally with the shaft.

Aspect 3. In the above aspect 1 or 2, it is preferable that the stator include: a stator core having a tube portion having the core inner peripheral surface, and a plurality of tooth portions protruding radially outward from the tube portion: a plurality of coils formed by winding a winding around the plurality of tooth portions, respectively; and an insulating layer formed by applying an insulating coating to the tooth portions around which the winding is wound. In this case, it is preferable that the bushing include a guide portion that is extended axially outward of a core end surface of the stator core from the fixed portion and with which a crossover wire connecting between the plurality of coils is in contact.

Aspect 4. In the above aspect 3, it is preferable that the bushing have a stepped shape in which an outer surface, which faces radially outward, of the guide portion is located radially outward of the core inner peripheral surface. In this case, it is preferable that a flat surface, which faces the other end side, of the guide portion be in contact with the core end surface.

Aspect 5. In the above aspect 3 or 4, it is preferable that the core inner peripheral surface be provided with a positioning groove extending in an axial direction. In this case, it is preferable that the guide portion be provided with a recessed portion of a recessed shape, in a second end surface facing in the same direction as the core end surface.

Aspect 6. In any of the above aspects 3 to 5, it is preferable that the stator core include six tooth portions.

Aspect 7. In any of the above aspects 1 to 6, it is preferable that the fixed portion include: a cylindrical base portion having an outer peripheral surface with an outer diameter that allows the outer peripheral surface to be from the inside to the core inner peripheral surface; and a protruding portion protruding from the outer peripheral surface of the base portion, and be press-fitted onto the core inner peripheral surface.

Aspect 8. In the above aspect 7, it is preferable that the fixed portion include three or more protruding portions. In this case, it is preferable that the three or more protruding portions be provided, spaced apart from one another in a circumferential direction.

Effects of the Invention

According to an outer rotor brushless motor of the disclosure, it is possible to suppress a reduction in the amount of oil in an impregnated bearing. Moreover, even if oil that has leaked from the impregnated bearing is not recovered sufficiently, it is possible to suppress the escape of the oil to the outside of the motor.

DESCRIPTION OF PREFERRED EMBODIMENT

An outer rotor brushless motor as an embodiment is described with reference to the drawings. The embodiment illustrated below is a mere example, and is not intended to preclude various modifications and application of a technology, which are not explicitly stated in the following embodiment. Configurations of the embodiment can be modified and carried out in various manners within the scope that does not depart from the purport of the configurations. Moreover, a selection can be made from the configurations as needed, or the configurations can be combined as appropriate.

The outer rotor brushless motor (hereinafter simply referred to as the "motor") includes a rotor that rotates integrally with a shaft, and a stator placed radially outward of the shaft and radially inward of the rotor. One of the features of the motor of the embodiment is to support the shaft by use of an impregnated bearing placed radially inward of the stator and to include a bushing provided on one end side of the impregnated bearing in an axial direction.

An oil repellent finish is applied to the surface of the bushing. In addition, an inner peripheral surface (a first inner peripheral surface) on the other end side, which is opposite to the one end side, of the bushing is placed, facing an outer peripheral surface of the shaft, with first clearance in between. Moreover, an end surface (a first end surface) on the other end side of the bushing is placed, facing an end surface (a bearing end surface) on the one end side of the impregnated bearing, with second clearance in between, the second clearance being greater than the first clearance. In the motor of the embodiment, such a bushing causes oil that has leaked from the impregnated bearing (hereinafter also referred to as "leaking oil") to be repelled by the first inner peripheral surface and first end surface to which the oil repellent finish has been applied, so that the oil is unlikely to enter the first clearance and is likely to be accumulated in the second clearance. Consequently, the suppression of a reduction in the amount of oil in the impregnated bearing is encouraged.

Moreover, another feature of the motor of the embodiment is to include a washer that is provided on the one end side relative to the impregnated bearing to rotate integrally with the shaft. The washer is placed radially inward of an inner peripheral surface (a second inner peripheral surface) on the one end side relative to the first inner peripheral surface of the bushing. The leaking oil is splashed by such a washer; therefore, the motor of the embodiment suppresses the leakage of leaking oil along the shaft toward the one end side relative to the washer and the escape of the leaking oil to the outside of the motor. In other words, the motor of the embodiment suppresses ingress of leaking oil into the first clearance and, even if the leaking oil enters the first clearance, suppresses the escape of the leaking oil to the outside of the motor.

In the following description, directions (an axial direction/axially, a circumferential direction, and a radial direction/radially) of the motor are determined relative to the shaft. The axial direction/axially indicates a direction along the center line of the shaft (a longitudinal direction of the shaft). In the axial direction, a side provided with the bushing relative to the stator is the "one end side," and the opposite side is the "other end side." The circumferential direction indicates a direction around the center line of the shaft (the direction of the circumference), and the radial direction/radially indicates a direction orthogonal to both the axial direction and the circumferential direction.

[1. Configuration]

Figure 1:
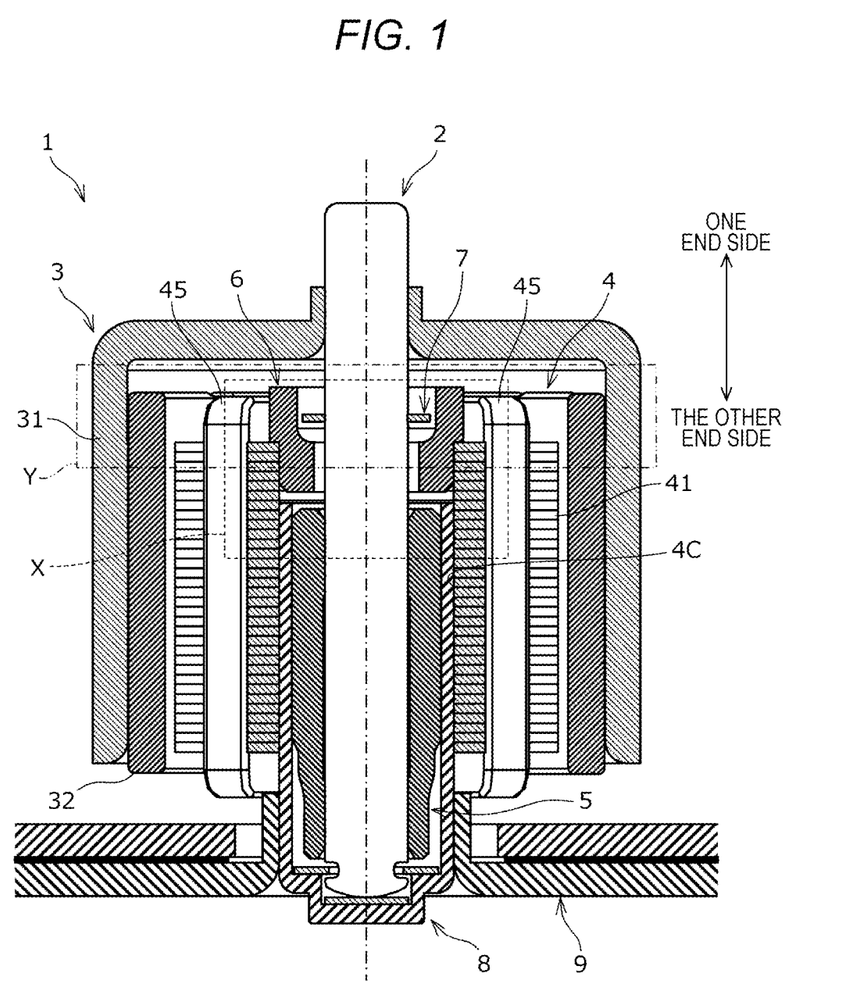
FIG. 1 is an axial cross-sectional view of an outer rotor brushless motor according to an embodiment.

FIG. 1 is a cross-sectional view of a motor 1 according to the embodiment, taken along the axial direction. As illustrated in FIG. 1, the motor 1 includes a shaft 2, a rotor 3, a stator 4, an impregnated bearing 5, a bushing 6, and a washer 7. Note that in FIG. 1, the bushing 6 is located above (on the one end side relative to) the impregnated bearing 5 in FIG. 1, however, the actual up-and-down direction of the motor 1 is not limited to the above. For example, the up-and-down direction of the motor 1 may be the same as the up-and-down direction illustrated in FIG. 1, or may be a reverse direction of the up-and-down direction of FIG. 1. In other words, the motor 1 may be one in which the bushing 6 is below the impregnated bearing 5. In this case, the one end side is downward (the direction of gravity), and the other end side is upward. Moreover, the axial direction of the shaft 2 is not necessarily the vertical direction. The motor 1 may be used in such a manner as to extend horizontally or obliquely.

The shaft 2 is a rotary shaft that supports the rotor 3, and also functions as an output shaft that takes the output (mechanical energy) of the motor 1 to the outside. Note that a hatch pattern indicating the cross section of the shaft 2 is omitted from the illustrations of FIGS. 1 and 2.

The rotor 3 is a component that rotates integrally with the shaft 2, and includes a bottomed cylindrical rotor yoke 31, and a magnet 32 fixed to an inner peripheral surface of the rotor yoke 31. The rotor yoke 31 has a shape that has a bottom portion located on the one end side and is open on the other end side. The center of the bottom portion of the rotor yoke 31 is provided with a through-hole in which the inserted shaft 2 is fixed. Consequently, the shaft 2 and the rotor yoke 31 (the rotor 3) rotate integrally. The magnet 32 is fixed to the inner peripheral surface of the rotor yoke 31 at a position away from the bottom portion, and rotates integrally with the rotor yoke 31.

The stator 4 is a component placed radially outward of the shaft 2 and radially inward of the rotor 3, and includes an inner peripheral surface 4C (hereinafter referred to as the "core inner peripheral surface 4C") along which the shaft 2 is inserted. For example, the stator 4 is fixed to a mounting plate 9 via a metal holder 8 bonded to the other end side of the core inner peripheral surface 4C. The mounting plate 9 is a plate member fixed to an unillustrated housing of the motor 1, or a part of a plate member forming the housing. The metal holder 8 is a bottomed cylindrical member that holds the impregnated bearing 5, and the other end side of the metal holder 8 is fixed to the mounting plate 9.

Note that the other end side of the metal holder 8 may be provided with a structure that restricts the movement of the shaft 2 toward the one end side. Moreover, for example, a board (electronic board or control board) may be attached to the mounting plate 9 via a thermal release tape. The stator 4 is fixed to such a mounting plate 9 and thereby is fixed in such a manner as not to allow it to rotate relative to the shaft 2.

The stator 4 includes a metal stator core 41, and a plurality of coils 45 formed by winding a winding W around the stator core 41. The stator 4 of the embodiment further includes an insulating layer 46 (refer to FIG. 2). The insulating layer 46 is a film formed by applying an insulating coating to the surface of the stator core 41. The insulating layer 46 encourages insulation between the stator core 41 and the plurality of coils 45 in the stator 4 of the embodiment.

In other words, the stator core 41 is covered with the insulating coating, instead of an insulator provided to a known stator, to form the insulating layer 46. Therefore, the stator 4 of the embodiment encourages the insulation between the stator core 41 and the plurality of coils 45. The method for insulating between the stator core 41 and the coils 45 is coating: therefore, the stator core 41 can be formed with a minimum core thickness. Hence, it is possible to secure a large space between a plurality of tooth portions 43 described below, so that the space factor can be increased to enhance the performance of the motor 1.

The stator core 41 is a laminated core obtained by laminating a plurality of steel sheets of the same shape. The shaft 2 is inserted through the center of the stator core 41 with the axial direction aligned with the steel sheet lamination direction. In other words, the above core inner peripheral surface 4C is formed on the stator core 41.

Figure 3:
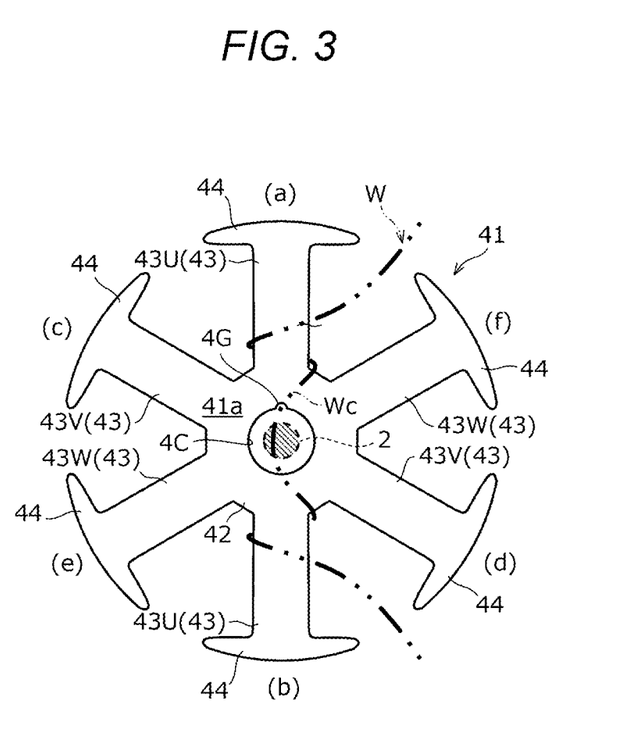
FIG. 3 is a plan view of a stator core of a stator included in the outer rotor brushless motor of FIG. 1 as viewed from one end side.

As illustrated in FIG. 3, the stator core 41 includes a tube portion 42, the plurality of tooth portions 43, and a plurality of blade portions 44. Note that FIG. 3 is a plan view of the stator core 41 as viewed from the one end side. The cross section of the shaft 2 inserted through the stator core 41 is indicated by a dashed line.

The tube portion 42 is a tubular part having the above core inner peripheral surface 4C. The core inner peripheral surface 4C is, for example, a cylindrical surface, and an inner diameter thereof is set to be greater than the outer diameter of the shaft 2. An outer peripheral surface of the tube portion 42 may be a cylindrical surface, or a rectangular prism surface. The stator 4 is placed in such a manner that the core inner peripheral surface 4C does not interfere with the shaft 2. Note that the tube portion 42 may be provided with a positioning groove 4G formed by depressing a part of the core inner peripheral surface 4C along the axial direction. The positioning groove 4G is provided to facilitate checking a reference position of the stator 4 in the circumferential direction upon assembly of the motor 1.

The tooth portions 43 are parts that protrude radially outward from the tube portion 42, and connect the tube portion 42 and the blade portions 44. The tooth portions 43 each has, for example, a rectangular shape as viewed in the axial direction. The stator 4 of the embodiment includes six tooth portions 43 spaced evenly in the circumferential direction.

The blade portions 44 are parts that extend in the circumferential direction from outer end portions of the tooth portions 43, respectively, and each have an arc shape as viewed in the axial direction. A surface, which faces radially outward, of each of the blade portions 44 faces a radially inner surface of the magnet 32 of the rotor 3. The plurality of blade portions 44 is provided to the plurality of tooth portions 43, respectively. In other words, the stator 4 of the embodiment includes six blade portions 44.

Figure 4:
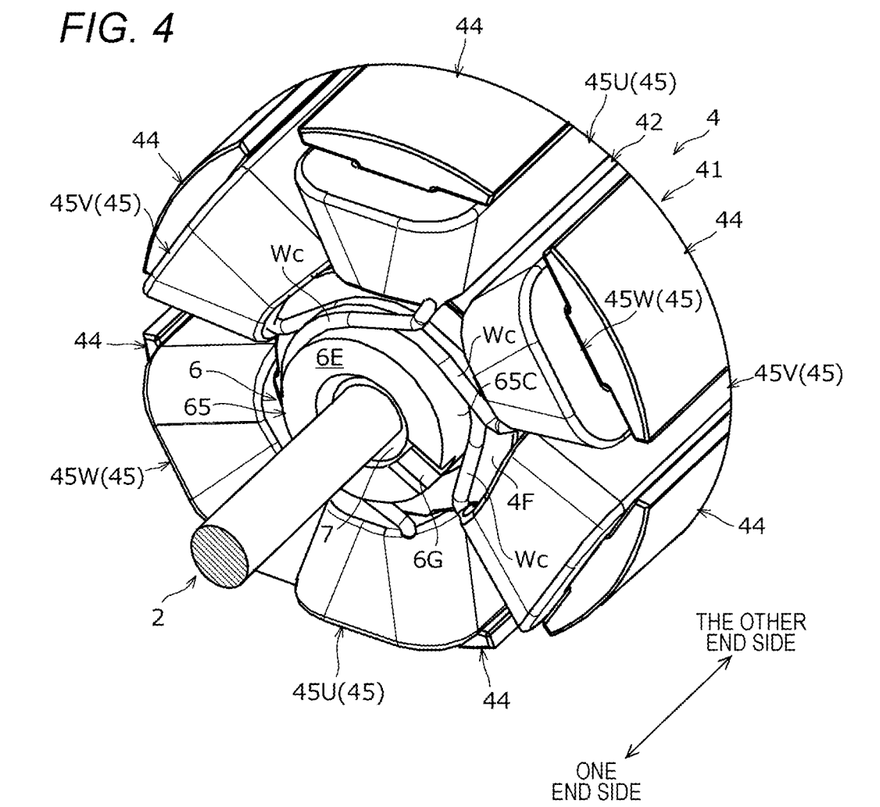
FIG. 4 is an enlarged perspective view of part Y of FIG. 1 as viewed from the one end side.

The plurality of coils 45 is formed by the winding W wound around the plurality of tooth portions 43, respectively. Put another way, what is formed by winding the winding W around the tooth portion 43 is referred to as the coil 45. As illustrated in FIG. 4, six coils 45 are provided, corresponding to the number of the above tooth portions 43, in the stator 4 of the embodiment.

In the following description, of the six coils 45, two coils 45 facing each other across the shaft 2 are also referred to as the U-phase coils 45U. Moreover, another two coils 45 facing each other across the shaft 2, which are different coils 45 that are different from the U-phase coils 45U, are also referred to as the V-phase coils 45V. The remaining two coils 45 are also referred to as the W-phase coils 45W. Moreover, the tooth portions 43 that are core materials of the U-phase coils 45U, the V-phase coils 45V, and the W-phase coils 45W are also referred to as the U-phase tooth portions 43U, the V-phase tooth portions 43V, and the W-phase tooth portions 43W (refer to FIG. 3), respectively.

A U-phase current is supplied to the U-phase coils 45U, a V-phase current is supplied to the V-phase coils 45V, and a W-phase current is supplied to the W-phase coils 45W. As illustrated in FIG. 4, each of the same phase pairs of the coils 45U, 45V, and 45W is connected to each other by a crossover wire Wc routed on an end surface 4F (hereinafter referred to as the "core end surface 4F") on the one end side of the stator core 41. In this manner, the each of the same phase pairs of the coils 45U, 45V, and 45W is continuously wound via the crossover wire Wc to enable efficiently performing a wire connection operation.

Figure 2:
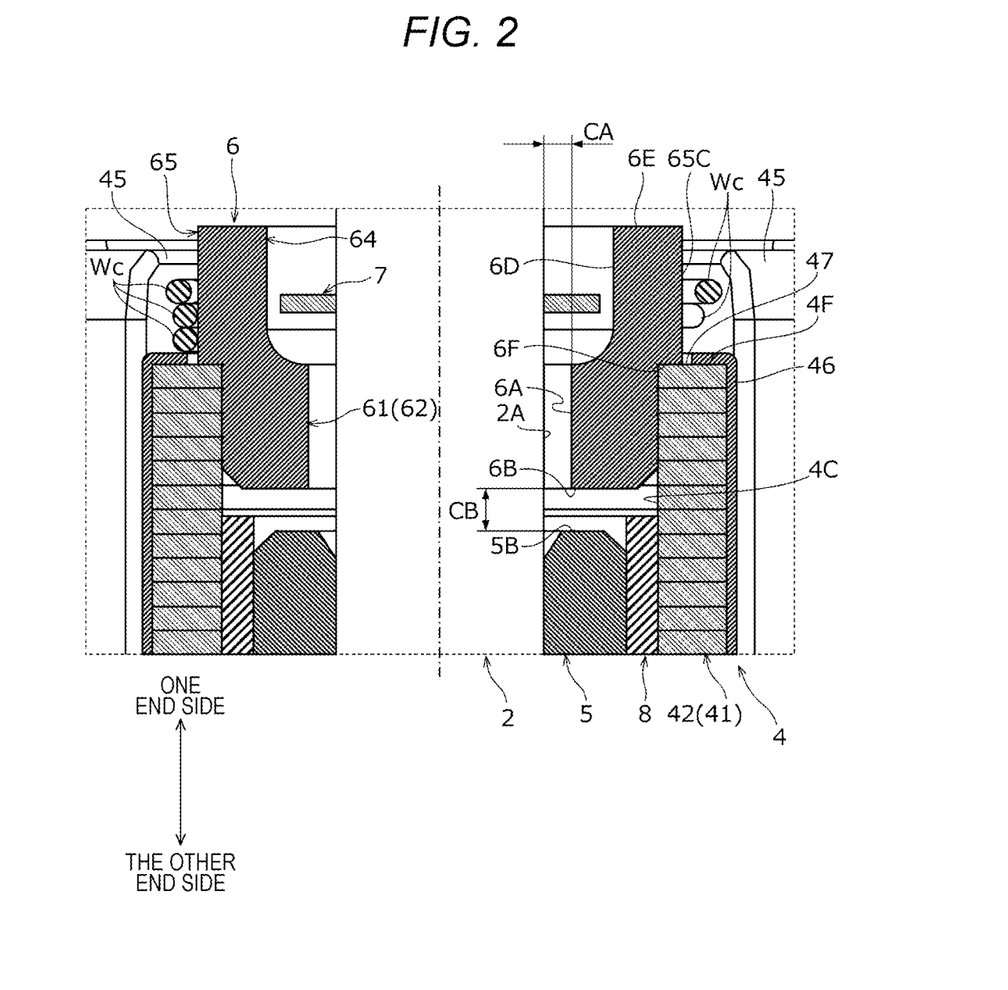
FIG. 2 is an enlarged view of part X of FIG. 1.

The insulating layer 46 is provided to the tooth portions 43 around which the winding W is wound. The insulating layer 46 is provided, for example, all over the tooth portions 43. Moreover, it is preferable that the insulating layer 46 be provided not only to the tooth portions 43 but also to the outer peripheral surface of the tube portion 42 and the core end surface 4F to further ensure insulation between the winding W and the stator core 41. In the embodiment, as illustrated in FIG. 2, the insulating layer 46 is provided to the core end surface 4F excluding a radially inner portion of the tube portion 42. The radially inner portion is also referred to below as the uncoated portion 47. The uncoated portion 47 is made use of as a portion that holds the stator core 41 upon application of the insulating coating.

The impregnated bearing 5 is a tubular sintered compact that is impregnated with a lubricant. As illustrated in FIG. 1, the impregnated bearing 5 is placed on the other end side of the bushing 6, and supports the shaft 2 rotatably. The impregnated bearing 5 of the embodiment is press-fitted into the metal holder 8 to be fixed in such a manner as not to allow it to rotate relative to the shaft 2. Put another way, the shaft 2 is inserted through such an impregnated bearing 5 to be rotatably supported, and therefore, is supported in such a manner as to allow it to rotate relative to the metal holder 8, the stator 4, and the mounting plate 9.

The impregnated bearing 5 has, for example, a cylindrical shape, and at least a part thereof (a portion on the one end side) is placed radially inward of the stator 4. Note that an inner peripheral surface of the impregnated bearing 5 is a cylindrical surface that is coaxial with the shaft 2, however, its outer shape (outer peripheral surface) is simply required to be a shape that is fixed in such a manner as not to allow it to rotate relative to the shaft 2, and may not be a cylindrical surface. Moreover, the outer peripheral surface of the impregnated bearing 5 may not be uniform in the axial direction. An end surface of the impregnated bearing 5 in the axial direction may be provided with a plurality of grooves to improve the absorption efficiency of the leaking oil.

When the shaft 2 rotates, what is called the pumping action occurs and the oil in the pores of the impregnated bearing 5 is sucked out. Consequently, an oil film is formed between the impregnated bearing 5 and the shaft 2 to function as a lubricant or cooling oil, and a part of the oil film leaks as leaking oil to the outside of the impregnated bearing 5. Moreover, in the leaking oil, leaking oil around the impregnated bearing 5 is absorbed into the pores. On the other hand, when the rotation of the shaft 2 stops, oil in contact with the surface of the impregnated bearing 5 is absorbed into the pores due to capillary action.

The bushing 6 is a tubular component that is fixed to the one end side of the stator 4 and through which the shaft 2 is inserted. The center line of the bushing 6 agrees with the center line of the shaft 2.

The bushing 6 has at least two functions. A first function is a function of suppressing the ingress of leaking oil between the busing 6 and the shaft 2 and accumulating the leaking oil between the bushing 6 and the impregnated bearing 5. A second function is a function of, if leaking oil enters between the bushing 6 and the shaft 2, suppressing the escape of the leaking oil from the motor 1. As illustrated in FIG. 2, the bushing 6 includes a fixed portion 61 and a housing portion 64 as parts that exert these functions. The fixed portion 61 is a part that exerts the first function, and the housing portion 64 is a part that together with the washer 7 exerts the second function.

The bushing 6 of the embodiment further has a third function of preventing interference between the crossover wires Wc and the shaft 2. The bushing 6 is provided with a guide portion 65 as a part that exerts that function. In the bushing 6 of the embodiment, the fixed portion 61 and the housing portion 64 are provided continuously in the axial direction, and the housing portion 64 and the guide portion 65 are provided continuously in the radial direction. Moreover, the fixed portion 61, the housing portion 64, and the guide portion 65 are integrated by use of insulating resin to form the bushing 6, and the oil repellent finish (for example, fluorine coating) is applied to the surface of the bushing 6.

Figure 5:
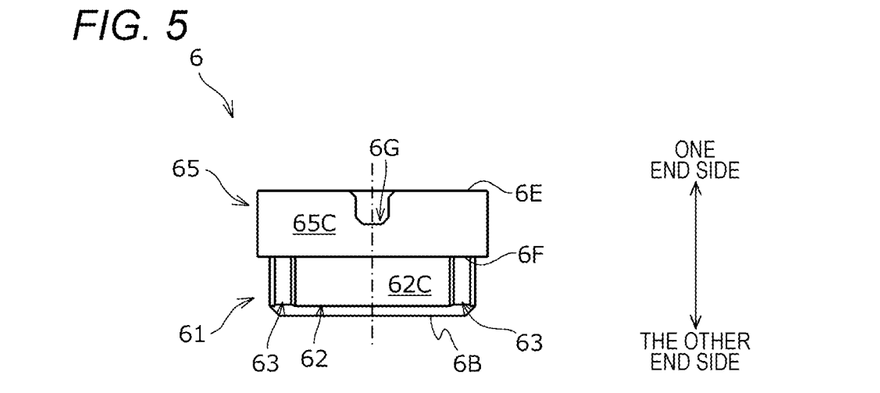
FIG. 5 is a side view of a bushing included in the outer rotor brushless motor of FIG. 1 as viewed from the radially outside.

The fixed portion 61 is a part for fixing the bushing 6 to the stator 4, and also the part that exerts the first function as described above. The fixed portion 61 includes a first end surface 6B placed, facing a bearing end surface 5B on the one end side of the impregnated bearing 5, and a first inner peripheral surface 6A placed, facing an outer peripheral surface 2A of the shaft 2, and is fixed to the core inner peripheral surface 4C. As illustrated in FIG. 5, the fixed portion 61 of the embodiment includes a cylindrical base portion 62, and a protruding portion 63 that protrudes radially outward from the base portion 62. The protruding portion 63 is pressure-welded to the core inner peripheral surface 4C to be press-fitted into the stator 4. The first end surface 6B and the first inner peripheral surface 6A are formed on the base portion 62 as illustrated in FIG. 2.

The base portion 62 has a cylindrical shape with an outer diameter and an inner diameter that are uniform in the axial direction. The outer diameter of an outer peripheral surface 62C (refer to FIG. 5) of the base portion 62 is set at, for example, a length that allows the outer peripheral surface 62C to be fitted from the inside to the core inner peripheral surface 4C (a length slightly less than the outer diameter of the core inner peripheral surface 4C).

The inner diameter of the base portion 62 (that is, the inner diameter of the first inner peripheral surface 6A) is set at a size that allows forming a slight gap in between with the outer peripheral surface 2A of the shaft 2 as illustrated in FIG. 2. The gap is referred to below as the first clearance CA. It is preferable that the first clearance CA be set to be at least less than the size of an oil droplet of leaking oil and narrow enough to prevent the rotating shaft 2 from interfering with the first inner peripheral surface 6A. The size of the first clearance CA is set at, for example, 0.1 mm to 0.5 mm.

The first end surface 6B, which is an end surface on the other end side, of the base portion 62 is placed, facing the bearing end surface 5B with second clearance CB in between with the bearing end surface 5B, the second clearance CB being greater than the first clearance CA. Put another way, the second clearance CB greater than the first clearance CA is provided between the first end surface 6B and the bearing end surface 5B. The two clearances CA and CB are set with such a magnitude relationship, and also the oil repellent finish is applied to the bushing 6 as described above. Therefore, leaking oil is repelled by the first inner peripheral surface 6A and first end surface 6B to which the oil repellent finish has been applied, which suppresses the ingress of the leaking oil into the first clearance CA and also the leaking oil is likely to be accumulated in the second clearance CB. Consequently, the first function of the bushing 6 is exerted. Note that when coming into contact with the impregnated bearing 5, the leaking oil accumulated in the second clearance CB is recovered by the impregnated bearing 5.

As illustrated in FIG. 5, the protruding portion 63 protrudes radially outward from the outer peripheral surface 62C of the base portion 62. The amount of protrusion of the protruding portion 63 relative to the outer peripheral surface 62C is set in such a manner that the outer diameter of the fixed portion 61 including the protruding portion 63 is slightly greater than the core inner peripheral surface 4C. Note that in the embodiment, the protruding portion 63 is provided along the entire length of the base portion 62 in the axial direction. However, the protruding portion 63 may be provided to a part of the base portion 62 in the axial direction.

Moreover, the fixed portion 61 may be provided with a plurality of the protruding portions 63. In the embodiment, three protruding portions 63 are provided to the fixed portion 61. The three protruding portions 63 have the same shape, and are provided, spaced apart from one another in the circumferential direction (in different phases in the circumferential direction). In terms of the protruding portions 63, it is preferable that the adjacent protruding portions 63 be spaced evenly in the circumferential direction from the viewpoint of increasing stability upon press-fitting of the bushing 6.

The housing portion 64 is a part in which the washer 7 is housed. As illustrated in FIG. 2, the housing portion 64 is a part that has a second inner peripheral surface 6D with a greater diameter than the first inner peripheral surface 6A, on the one end side of the fixed portion 61. In the embodiment, the second inner peripheral surface 6D is formed from a second end surface 6E on the one end side of the bushing 6 toward the other end side.

The second inner peripheral surface 6D is set in such a manner that an inner diameter thereof is slightly greater than the outer diameter of the washer 7 to allow the washer 7 to be placed radially inward of the second inner peripheral surface 6D. Note that in the embodiment, the second inner peripheral surface 6D is located on the one end side relative to the core end surface 4F (that is, the stator core 41). However, the second inner peripheral surface 6D is simply required to allow the washer 7 to be placed radially inward of the second inner peripheral surface 6D, and may extend toward the other end side beyond the core end surface 4F.

The guide portion 65 is a part that is extended in the axial direction from the fixed portion 61 beyond the core end surface 4F, and is in contact with the crossover wires Wc. The guide portion 65 guides the crossover wires Wc to exert the third function as described above. In the embodiment, the guide portion 65 is provided radially outward of the housing portion 64. In other words, a portion, which is on the one end side relative to the fixed portion 61, of the bushing 6 of the embodiment serves as both the housing portion 64 and the guide portion 65.

The third function is described here in detail. As described above, in the stator 4 of the embodiment, the each of the same phase pairs of the coils 45U, 45V, and 45W is connected by the crossover wire Wc. Moreover, the each of the same phase pairs of the coils 45U, 45V, and 45W is placed, facing each other across the shaft 2.

Hence, without the bushing 6, the crossover wire Wc of, for example, the U-phase coils 45U can be routed in a path (winding track) passing through the cross section of the shaft 2, as indicated by chain double-dashed lines in FIG. 3. Consequently, the shaft 2 and the crossover wire Wc may contact (interfere with) each other and the crossover wire Wc may break. In contrast, in the motor 1 of the embodiment, as illustrated in FIGS. 2 and 4, the guide portion 65 protruding toward the one end side relative to the core end surface 4F guides the crossover wire Wc to suppress the routing of the crossover wire Wc radially inward. Put another way, the guide portion 65 provided to the bushing 6 exerts the third function to prevent such interference between the crossover wires Wc and the shaft 2.

The guide portion 65 has, for example, a circular outer shape as viewed in the axial direction as illustrated in FIG. 4. The guide portion 65 is set in such a manner that an outer diameter thereof is uniform in the axial direction, and is greater than the inner diameter of the core inner peripheral surface 4C as illustrated in FIG. 2. In other words, an outer surface 65C, which faces radially outward, of the guide portion 65 has a stepped shape located radially outward of the core inner peripheral surface 4C. If attention is given to the surfaces, which face radially outward, of the bushing 6, that is, an outer peripheral surface of the fixed portion 61 and the outer surface 65C of the guide portion 65, the latter has a greater radial dimension than the former. Therefore, a step surface 6F (a flat surface) is formed on a boundary portion between the fixed portion 61 and the guide portion 65. The step surface 6F is an annular flat surface, which faces the other end side, of the guide portion 65, and may be in contact with the core end surface 4F. Consequently, the position of the bushing 6 relative to the stator core 41 can be determined. Furthermore, the step surface 6F is in contact with the core end surface 4F, so that the bushing 6 and the stator core 41 are sealed. Therefore, the leakage of leaking oil from a radially outer side of the bushing 6 to the one end side of the stator core 41 is suppressed.

It is more preferable that the outer diameter of the guide portion 65 be set in such a manner that a gap formed between the outer surface 65C and the insulating layer 46 is less than the outer diameter of the winding W (the crossover wires Wc) even if the outer diameter of the guide portion 65 has a size that covers the entire uncoated portion 47 of the core end surface 4F, or a size that covers a part of the uncoated portion 47. In this manner, the outer diameter of the guide portion 65 is set to enable routing the crossover wires Wc on the insulating layer 46. Put another way, it is possible to prevent the crossover wires Wc from coming into contact with the core end surface 4F, so that the insulation between the winding W and the stator core 41 is further encouraged.

If the outer surface 65C of the guide portion 65 is located radially outward of the core inner peripheral surface 4C, the positioning groove 4G of the core inner peripheral surface 4C is not visible from the one end side as illustrated in FIG. 4. Hence, the guide portion 65 of the embodiment is provided, in the second end surface 6E thereof, with a recessed portion 6G of a recessed shape. Upon insertion of the bushing 6 into the stator core 41, the bushing 6 is inserted into the stator core 41 with the recessed portion 6G in phase with the positioning groove 4G. Therefore, the position of the positioning groove 4G can be indirectly checked via the recessed portion 6G. Note that in the embodiment, the recessed portion 6G is provided in such a manner that the outer shape of the second end surface 6E has a C-shape. However, the recessed portion 6G is simply required to be visible at least from the one end side, and the shape of the recessed portion 6G is not limited to a C-shape.

The amount of protrusion of the guide portion 65 from the core end surface 4F is set to be greater than at least the outer diameter of the crossover wires Wc. As illustrated in FIGS. 2 and 4, a plurality of the crossover wires Wc overlaps one another in the axial direction and can contact the outer surface 65C of the guide portion 65. Hence, it is preferable that the amount of protrusion of the guide portion 65 be set to be greater than the sum of the outer diameters of the maximum number of (here, three) the crossover wires Wc that are routed, overlapping one another.

The washer 7 is a component that together with the housing portion 64 exerts the above second function as described above, is provided on the one end side relative to the impregnated bearing 5, and is placed radially inward of the second inner peripheral surface 6D of the housing portion 64. The washer 7 has, for example, an annular shape as viewed in the axial direction. The shaft 2 is press-fitted into a central through-hole of the washer 7, so that the washer 7 rotates integrally with the shaft 2. Note that, for example, metal or resin is used as the material of the washer 7.

The washer 7 is placed radially inward of the second inner peripheral surface 6D of the housing portion 64. Therefore, the outer diameter of the washer 7 is set to be less than at least the inner diameter of the second inner peripheral surface 6D. It is more preferable that the outer diameter of the washer 7 be set in such a manner as to be greater than the inner diameter of the first inner peripheral surface 6A and in such a manner that a gap in between with the second inner peripheral surface 6D is as narrow as possible (for example, approximately 0.1 mm). Note that the thickness of the washer 7 in the axial direction is set to be less than at least the length of the second inner peripheral surface 6D of the bushing 6 in the axial direction.

In the motor 1, such a washer 7 and the housing portion 64 exert the second function. Specifically, if the actual up-and-down direction of the motor 1 corresponds to the up-and-down direction of FIG. 1, the leaking oil that has entered between the bushing 6 and the shaft 2 is splashed by the washer 7 that rotates integrally with the shaft 2 onto the second inner peripheral surface 6D, and therefore stays inside the housing portion 64 in the radial direction. Consequently, the release of leaking oil toward the one end side relative to the bushing 6 is suppressed, and the escape of leaking oil from the motor 1 is suppressed. In addition, the leaking oil accumulated inside the housing portion 64 in the radial direction can be returned to the other end side (that is, to the impregnated bearing 5) due to gravity. Hence, the suppression of a reduction in the amount of oil in the impregnated bearing 5 can also be encouraged.

Note that also if the actual up-and-down direction of the motor 1 is the reverse direction of the up-and-down direction of FIG. 1, the washer 7 and the housing portion 64 exert the second function. In this case, leaking oil cannot stay inside the housing portion 64. However, leaking oil is splashed by the washer 7, and therefore, it is possible to suppress the direct entrance of the leaking oil that has flowed along the shaft 2, between the shaft 2 and the rotor 3. Put another way, the washer 7 suppresses the accumulatio of leaking oil near the place in which the rotor 3 is fixed to the shaft 2. Therefore, the escape of leaking oil from the motor 1 can be suppressed.

An example of the flow of assembly of the motor 1 is described below. Firstly, the impregnated bearing 5 is inserted from the one end side of the metal holder 8, and is press-fitted into the metal holder 8. The stator core 41 that is covered with the insulating coating and around which the winding W is not wound (that is, the stator core 41 in the state illustrated in FIG. 3) is then bonded to the metal holder 8.

The bushing 6 to which the oil repellent finish has been applied is subsequently inserted from the one end side onto the core inner peripheral surface 4C. Consequently, the protruding portions 63 of the fixed portion 61 are pressure-welded to the core inner peripheral surface 4C, and the bushing 6 is press-fitted to the stator core 41. Moreover, as illustrated in FIG. 2, the bearing end surface 5B of the impregnated bearing 5 and the first end surface 6B of the bushing 6 are placed, facing each other with the second clearance CB therebetween. Therefore, a space in which leaking oil can be accumulated is secured between the impregnated bearing 5 and the bushing 6.

Note that at this point in time, the core inner peripheral surface 4C presses the protruding portions 63 radially inward. However, this force is absorbed by the protruding portions 63 expanding and deforming in the circumferential direction. In this manner, in the embodiment, the plurality of the protruding portions 63 is provided, spaced apart from one another in the circumferential direction. Therefore, the expansion and deformation of each of the protruding portions 63 in the circumferential direction are permitted, so that the deformation of the first inner peripheral surface 6A of the bushing 6 due to press-fitting can be suppressed. Hence, a space into which the shaft 2 can be inserted can be maintained inside the bushing 6 in the radial direction. Moreover, the protruding portions 63 are provided, spaced evenly in the circumferential direction, so that the bushing 6 can be fixed to the stator core 41 more stably.

In terms of the bushing 6 that has been inserted from the one end side, the step surface 6F is in contact with the core end surface 4F to prevent the guide portion 65 from making its way onto the core inner peripheral surface 4C and to determine the position of the bushing 6. In addition, the bushing 6 and the stator core 41 are sealed, so that the leakage of leaking oil from the radially outer side of the bushing 6 toward the one end side of the stator core 41 is suppressed. Furthermore, the uncoated portion 47 is partially covered with the guide portion 65 from the one end side, so that the insulation between the winding W to be wound around the stator core 41 in the subsequent process and the stator core 41 is encouraged.

Moreover, when the bushing 6 is inserted into the stator core 41, if the bushing 6 is inserted in such a manner that the positioning groove 4G is in phase with the recessed portion 6G, then the reference position of the stator 4 in the circumferential direction can be checked from the one end side as illustrated in FIG. 4 even after the bushing 6 is inserted. Hence, the motor 1 can be smoothly assembled in the subsequent process.

Next, the winding W is wound around the stator core 41 to which the bushing 6 has been fixed to form the coils 45. In the embodiment, the flow of formation of the coils 45 is as follows: one winding W is wrapped around the tooth portions 43U, 43V, and 43W in turn on a phase by phase basis to form the six coils 45, and then the winding W is cut at points where the coils 45U, 45V, and 45W of the different phases are connected. In this manner, one winding W is wound round without being cut (in a unicursal manner), which makes it possible to increase work efficiency.

Specifically, the winding W is wrapped around the tooth portions 43 in the order of (a) to (f) illustrated in FIG. 3. In other words, the winding W is wrapped around one of the two U-phase tooth portions 43U first to form a first U-phase coil 45U [(a) in FIG. 3]. The end wire is then routed as the crossover wire Wc along the outer surface 65C as illustrated in FIG. 4. The winding W is wrapped around the other U-phase tooth portion 43U to form a second U-phase coil 45U [(b) in FIG. 3].

Next, the end wire of the second U-phase coil 45U is routed along the outer surface 65C. The winding W is wrapped around one of the V-phase tooth portion 43V, which is adjacent to the one of the U-phase tooth portions 43U, to form a first V-phase coil 45V [(c) in FIG. 3]. The end wire is subsequently routed as the crossover wire Wc along the outer surface 65C. The winding W is wrapped around the other V-phase tooth portion 43V to form a second V-phase coil 45V [(d) in FIG. 3]. Furthermore, a first W-phase coil 45W and a second W-phase coil 45W are formed in the same manner [(e) and (f) in the same figure]. Lastly, the winding W is cut at points between the second U-phase coil 45U and the first V-phase coil 45V and between the second V-phase coil 45V and the first W-phase coil 45W.

One ends of the coils 45U, 45V, and 45W of each phase are then tied into a bundle as a COM line, and the other ends are bundled with an unillustrated bundle pin to be connected to the board, and to fix the metal holder 8 to the mounting plate 9. Furthermore, the shaft 2 to which the rotor 3 and the washer 7 have been fixed is inserted into the inner hole of the bushing 6 from the one end side of the bushing 6 to complete the assembly of the motor 1. Consequently, the first clearance CA narrower than the second clearance CB is formed between the outer peripheral surface 2A of the shaft 2 and the first inner peripheral surface 6A of the bushing 6 as illustrated in FIG. 2. Moreover, the washer 7 is placed in the housing portion 64 of the bushing 6 (radially inward of the second inner peripheral surface 6D).

Note that the assembly procedure of the motor 1 is simply required to fix the bushing 6 to the stator core 41 at least before winding the winding W, and is not limited to the above. For example, the impregnated bearing 5 and the metal holder 8 may be fixed to the stator 4 after the coils 45 are formed (that is, after the winding W is wound).

[2. Operations, Effects]

(1) According to the above-mentioned motor 1, the fixed portion 61 of the bushing 6 having at least the first inner peripheral surface 6A and first end surface 6B to which the oil repellent finish has been applied can exert the first function. In other words, it is possible to suppress the ingress of leaking oil between the shaft 2 and the bushing 6 (that is, into the first clearance CA) and to accumulate the leaking oil between the impregnated bearing 5 and the bearing 6 (that is, into the second clearance CB). Hence, it is possible to suppress a reduction in the amount of oil in the impregnated bearing 5.

Moreover, according to the above-mentioned motor 1, the housing portion 64 of the bushing 6, and the washer 7 can exert the second function. In other words, even if leaking oil enters between the bushing 6 and the shaft 2, it is possible to suppress the escape of the leaking oil to the outside of the motor 1. Hence, it is possible to suppress a reduction in the amount of oil in the impregnated bearing 5 and to suppress the escape of the oil to the outside of the motor 1 even if the leaking oil is not recovered sufficiently.

(2) In the above-mentioned motor 1, the insulating layer 46 formed by the insulating coating insulates between the stator core 41 and the coils 45. In this manner, the method for insulating between the stator core 41 and the coils 45 is the insulating coating instead of the known configuration that provides an insulator. Therefore, large spaces between the adjacent tooth portions 43 can be secured. Hence, the space factor can be increased, so that the performance of the motor 1 can be enhanced. Furthermore, an insulator is not required, so that it is possible to reduce the number of components and simplify the configuration of the motor 1.

In addition, according to the above-mentioned motor 1, the guide portion 65 provided to the bushing 6 can exert the third function. In other words, the crossover wires Wc that may interfere with the shaft 2 can be routed in contact with the guide portion 65 of the bushing 6, so that contact (interference) between the shaft 2 and the crossover wires Wc can be prevented. Hence, it is possible to prevent the crossover wires Wc from breaking and enhance the performance of the motor 1.

(3) In the above-mentioned motor 1, the bushing 6 is configured in such a manner that the outer surface 65C of the guide portion 65 has the stepped shape located radially outward of the core inner peripheral surface 4C. Consequently, it is possible to prevent the guide portion 65 from making its way onto the core inner peripheral surface 4C. Hence, it is possible to further prevent contact between the shaft 2 and the crossover wires Wc and to determine the position of the bushing 6. Moreover, even if there is the uncoated portion 47 that is not covered with the insulating coating, the guide portion 65 can also suppress contact between the uncoated portion 47 and the crossover wires Wc, so that insulation performance can be secured. Furthermore, the step surface 6F is in contact with the core end surface 4F, so that the bushing 6 and the stator core 41 are sealed. Therefore, it is possible to suppress the leakage of leaking oil from the radially outer side of the bushing 6, which in turn can suppress a reduction in the amount of oil in the impregnated bearing 5.

(4) In the above-mentioned motor 1, the core inner peripheral surface 4C of the stator core 41 is provided with the positioning groove 4G, and the second end surface 6E of the bushing 6 is provided with the recessed portion 6G. Consequently, upon assembly of the motor 1, the bushing 6 is assembled to the stator core 41 with the positioning groove 4G in phase with the recessed portion 6G, and therefore, the position of the positioning groove 4G can be indirectly checked via the recessed portion 6G. Hence, the workability of the assembly operation of the motor 1 can be improved.

(5) In the above-mentioned motor 1, the stator 4 includes the six tooth portions 43. If the number of the tooth portions 43 is six, the each of the same phase pairs of the coils 45U, 45V, and 45W is placed, facing each other across the shaft 2 as described above. Hence, without the bushing 6, the crossover wires Wc tend to make their way radially inward of the stator core 41. However, in the above-mentioned motor 1, the guide portion 65 inhibits the crossover wires Wc from making their way radially inward, so that interference between the crossover wires Wc and the shaft 2 can be prevented.

(6) In the above-mentioned motor 1, the fixed portion 61 including the base portion 62 and the protruding portions 63 is press-fitted onto the core inner peripheral surface 4C, and therefore, the bushing 6 is fixed to the stator core 41. In this manner, the bushing 6 is fixed to the stator core 41 by press-fitting. Therefore, the number of man-hours related to the fixing can be reduced. Moreover, the base portion 62 itself is not press-fitted, however, the protruding portions 63 are provided to enable suppressing the deformation of the base portion 62 upon press-fitting. Hence, the space into which the shaft 2 can be inserted can be maintained inside the bushing 6, which has been fixed to the stator core 41, in the radial direction.

(7) In the above-mentioned motor 1, the three protruding portions 63 are provided, spaced apart from one another in the circumferential direction. Consequently, it is possible to make it easier to align the centers upon the insertion of the bushing 6 into the stator core 41. Moreover, the three protruding portions 63 are provided, spaced apart from one another in the circumferential direction. Therefore, the expansion and deformation of the each of the protruding portions 63 in the circumferential direction upon press-fitting are permitted. Hence, the space into which the shaft 2 can be inserted can be maintained inside the bushing 6, which has been fixed to the stator core 41, in the radial direction.

[3. Others]

The above-mentioned motor 1 is an example, and is not limited to the above-mentioned configuration. In addition to the washer 7, a second washer that rotates integrally with the shaft 2 may be provided in the second clearance CB in the motor 1. Such a second washer is provided to enable suppressing the reaching of leaking oil directly to the first clearance CA along the shaft 2. Hence, it is possible to further suppress the ingress of leaking oil into the first clearance CA. Moreover, the leaking oil accumulated in the second clearance CB can be splashed by the second washer and returned to the impregnated bearing 5. Therefore, the oil circulation function can be improved further.

The bushing 6 is simply required to be provided with at least the fixed portion 61 and the housing portion 64. The guide portion 65 may be omitted. If the guide portion 65 is provided, the guide portion 65 may be provided continuously not on a radially outer side of the housing portion 64 but on the one end side of the housing portion 64 in the axial direction. If the guide portion 65 is not provided, the housing portion 64 may be placed radially inward of the stator core 41. In other words, the entire bushing 6 may be placed radially inward of the stator core 41. Moreover, the oil repellent finish that is applied to the bushing 6 is simply required to be applied to at least the first inner peripheral surface 6A and the first end surface 6B, and may not be applied to the entire bushing 6.

The fixed portion 61 is simply required to at least have a shape that has the first inner peripheral surface 6A and the first end surface 6B and that is fixed to the core inner peripheral surface 4C. Moreover, the housing portion 64 is simply required to at least have a shape that has the second inner peripheral surface 6D on the one end side of the fixed portion 61. The first inner peripheral surface 6A is simply required to at least be able to have the first clearance 6A in between with the outer peripheral surface 2A of the shaft 2 on the other end side of the first inner peripheral surface 6A (near the connection portion with the first end surface 6B). Moreover, the second inner peripheral surface 6D is simply required to at least have a shape that has a greater diameter than the first inner peripheral surface 6A and that allows the washer 7 to be placed radially inward of the second inner peripheral surface 6D. Hence, the diameter of each of the first inner peripheral surface 6A and the second inner peripheral surface 6D may not be uniform in the axial direction. The first inner peripheral surface 6A and the second inner peripheral surface 6D may have, for example, a taper shape that increases in diameter toward the one end side. In this case, the leaking oil accumulated in the bushing 6 can be returned again to the other end side (that is, to the impregnated bearing 5), depending on the actual motor 1.

Instead of the fixed portion 61 including the base portion 62 and the protruding portions 63, the fixed portion may have, for example, a tubular (rectangular tube) shape that forms the outer shape of a polygon as viewed in the axial direction. In this case, upon press-fitting of the bushing 6 into the stator core 41, the corners of the fixed portion are pressure-welded to the core inner peripheral surface 4C and deformed. Therefore, the deformation of the first inner peripheral surface 6A can be suppressed. Moreover, the method for fixing the bushing 6 to the stator 4 may not be press-fitting, and may be, for example, bonding.

The number of the protruding portions 63 is not limited three, either. For example, four or more protruding portions 63 may be provided. If it is not required to align the centers upon fixing of the bushing 6 to the stator core 41, the number of the protruding portions 63 may be less than three. Moreover, the shape of the protruding portions 63 is not limited to the above-mentioned shape, either. The protruding portions may be provided, for example, extending along the circumferential direction of the base portion 62. At this point in time, a plurality of the protruding portions may be provided. In this case, if the plurality of the protruding portions is provided, spaced apart from one another in the axial direction, the deformation of the protruding portions in the axial direction is permitted upon press-fitting. Therefore, the deformation of the inner hole of the busing can be suppressed.

The guide portion 65 is simply required to be at least one that is extended axially outward of the core end surface 4F from the fixed portion 61 and with which the crossover wires Wc come into contact, and may not have a circular outer shape as viewed in the axial direction. The outer shape of the guide portion 65 may be, for example, polygonal. Moreover, the outer surface 65C of the guide portion 65 may not be located radially outward of the core inner peripheral surface 4C. In other words, the bushing 6 may not have the stepped shape. In this case, it is preferable to fix the fixed portion 61 in such a manner that the entire outer peripheral surface thereof in the circumferential direction comes into contact with the core inner peripheral surface 4C, to encourage the suppression of the leakage of leaking oil from the radially outer side of the bushing 6. Moreover, in this case, the recessed portion 6G may be omitted.

The number of the tooth portions 43 of the stator 4 may not be six. The insulating layer 46 provided to the stator 4 may cover the entire core end surface 4C. If the spaces between the adjacent tooth portions 43 are large, the stator 4 may be provided with a known insulator provided to the stator. In this case, the insulating layer 46 may be omitted. The core inner peripheral surface 4C may not be provided with the positioning groove 4G.

The invention claimed is:

1. An outer rotor brushless motor comprising:

a rotor configured to rotate integrally with a shaft;

a stator placed radially outward of the shaft and radially inward of the rotor;

a tubular bushing that is fixed to one end side of the stator and through which the shaft is inserted;

an impregnated bearing placed radially inward of the stator and on the other end side of the bushing and configured to support the shaft rotatably; and a washer provided on the one end side relative to the impregnated bearing and configured to rotate integrally with the shaft, wherein the bushing includes:

a fixed portion fixed to a core inner peripheral surface of the stator, the fixed portion having: a first end surface facing a bearing end surface on the one end side of the impregnated bearing; and a first inner peripheral surface facing an outer peripheral surface of the shaft with a first clearance in between the outer peripheral surface of the shaft and the first inner peripheral surface; and a housing portion having a second inner peripheral surface with a greater diameter than the first inner peripheral surface, on the one end side of the fixed portion, an oil repellent finish is applied to at least the first end surface and the first inner peripheral surface, the washer is placed radially inward of the second inner peripheral surface, and a second clearance greater than the first clearance is provided between the bearing end surface and the first end surface.

2. The outer rotor brushless motor according to claim 1, further comprising a second washer placed in the second clearance and configured to rotate integrally with the shaft.

3. The outer rotor brushless motor according to claim 1, wherein
the stator includes:
a stator core having a tube portion having the core inner peripheral surface, and a plurality of tooth portions protruding radially outward from the tube portion;
a plurality of coils formed by winding a winding around the plurality of tooth portions, respectively; and
an insulating layer formed by applying an insulating coating to the tooth portions around which the winding is wound, and
the bushing includes a guide portion that is extended axially outward of a core end surface of the stator core from the fixed portion and with which a crossover wire connecting between the plurality of coils is in contact.

4. The outer rotor brushless motor according to claim 3, wherein
the bushing has a stepped shape in which an outer surface, which faces radially outward, of the guide portion is located radially outward of the core inner peripheral surface, and
a flat surface, which faces the other end side, of the guide portion is in contact with the core end surface.

5. The outer rotor brushless motor according to claim 4, wherein
the core inner peripheral surface is provided with a positioning groove extending in an axial direction, and
the guide portion is provided with a recessed portion of a recessed shape, in a second end surface facing in the same direction as the core end surface.

6. The outer rotor brushless motor according to claim 5, wherein the stator core includes six tooth portions.

7. The outer rotor brushless motor according to claim 1, wherein the fixed portion includes: a cylindrical base portion having an outer peripheral surface with an outer diameter that allows the outer peripheral surface to be fitted from the inside to the core inner peripheral surface; and a protruding portion protruding from the outer peripheral surface of the base portion, and is press-fitted onto the core inner peripheral surface.

8. The outer rotor brushless motor according to claim 7, wherein
the fixed portion includes three or more protruding portions, and
the three or more protruding portions are provided, spaced apart from one another in a circumferential direction.

* * * * *